Oct. 8, 1940.  F. E. CLEMONS  2,216,907
INDEPENDENT WHEEL SUSPENSION
Filed Jan. 10, 1938  2 Sheets-Sheet 1
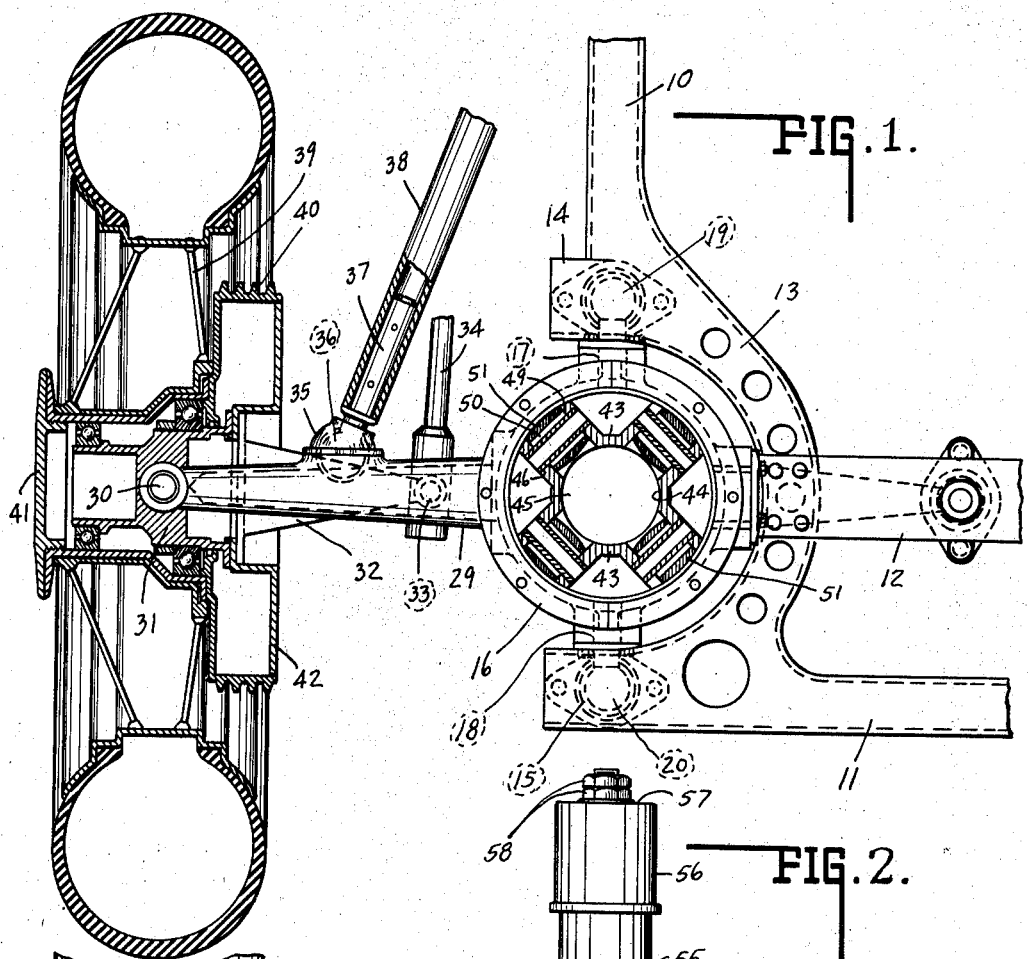
INVENTOR.
FREDERICK E. CLEMONS.
BY Lockwood Goldsmith & Galt
ATTORNEYS.

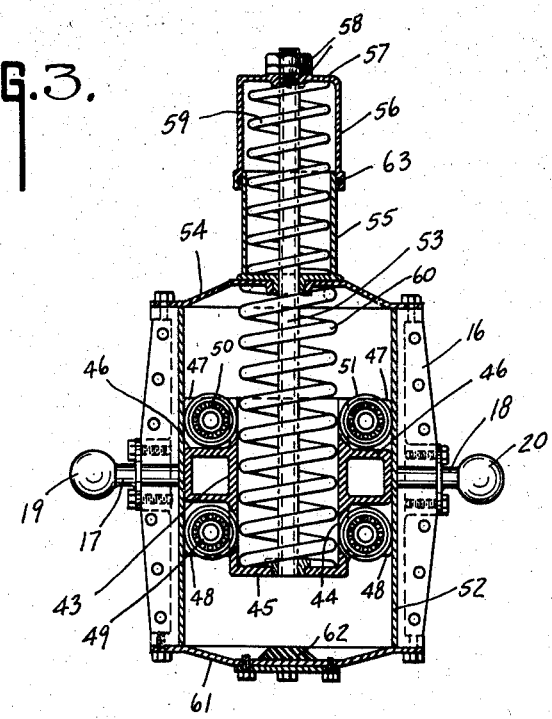

Patented Oct. 8, 1940

2,216,907

UNITED STATES PATENT OFFICE 2,216,907

INDEPENDENT WHEEL SUSPENSION

Frederick E. Clemons, Indianapolis, Ind.

Application January 10, 1938, Serial No. 184,185

7 Claims. (Cl. 280—96.2)

This invention relates to motor vehicles and is primarily directed to independent wheel suspension and adjustable camber.

The chief object of this invention is to provide a motor vehicle driving and/or steering wheel with a relatively independent mounting, whereby camber of the wheel may be readily adjusted and retained in adjusted position and the wheel at the same time may be relatively independently mounted with respect to the axially aligned wheel, permitting independent wheel action, that is, movement of each wheel independent of the other and the frame in an up and down direction.

The chief feature of the invention consists in the accomplishment of the foregoing objects.

Another feature of the invention consists in slidably mounting each wheel for the aforesaid independent action or movement and associating the mounting arrangement with a spring, if, as and when desired, which may be of transverse or longitudinal type with respect to the longitudinal axis of the vehicle or may be entirely omitted.

This application is a continuation-in-part of the copending application, Serial No. 739,370, filed August 11, 1934, entitled "Independent wheel suspension," and allowed April 14, 1937, and now Patent Number 2,104,736, dated January 11, 1938, and the first portion of the instant application is identical to the last portion of the copending application.

The full nature of the invention will be understood from the accompanying drawings and the following description and claims.

In the drawings—

Fig. 1 is a top plan view of a portion of the frame of a vehicle and the front and steering end of the same including the dirigible wheel and support therefor, the wheel and other portions being shown in horizontal section to illustrate the same and other parts more clearly, all of the aforesaid being of a modified form of the invention.

Fig. 2 is a front view of the aforesaid modified form of the invention.

Fig. 3 is a vertical sectional view of the main support for the dirigible wheel shown in Figs. 1 and 2.

In Figs. 1 to 3 of the drawings, there is illustrated one form of the invention. In said figures 10 indicates a side portion of a vehicle frame, 11 the front cross member portion which frame is reenforced by a parallel cross member 12. The side member 10 includes a semi-circular portion 13 and the junction of the same with the portion 10 provides a universal socket 14 and diametrically aligned therewith is a similar socket 15 at the junction of the semi-circular portion 13 of the frame with the front cross member portion 11 thereof.

A cylindrical type housing structure 16 includes the trunnions 17 and 18 which terminate in balls 19 and 20 receivable by the sockets 14 and 15, respectively. This ball and socket arrangement is of cushioned rubber character and per se is common in the automotive industry at the present time, but not for vibration dampening in wheel mountings.

Extending below the cross member 12 and in alignment therewith, see Figs. 1 and 2, is an arm 21 that terminates at one end in a socket 22 of universal character which receives a ball 23 of similar character that has a stem portion 24 which is threaded at 25 and nuts 26 and 27 adjustably secure the stem 24 in the desired position. The other end is secured to a boss (not numbered) carried by housing 16. This adjustment provides for the adjustment for camber, it being understood that as the stem 24 is elevated the longitudinal axis of the cylindrical housing 16—see Fig. 2—is tilted counterclockwise and lowering movement of the member 24 relative to cross member 12 of the frame secures reverse tilting of the cylindrical housing, said tilting taking place upon the universal support arrangement parts, defined by the numerals 14 to 20, inclusive, before identified.

The cylindrical housing 16 includes an elongated slot 28 in which is mounted for reciprocation an arm or stub axle 29 that terminates in a steering knuckle arrangement 30 upon which is pivotally mounted portion 31 from which there is extended portion 32 having connection at 33 with the steering rod member 34.

The member 29 is provided with a socket 35 with which is associated a similar ball structure 36 having a stem 37 suitably secured to a tubular member 38. The opposite end of member 38 mounts a similar structure (not shown) which is similarly mounted in a socket arrangement provided on or in the side of the frame 10. This constitutes a stabilizing structure and is one method of preventing oscillatory movement of the member 29 from the position shown in Fig. 1.

Another method not shown may be by the provision of suitable confining cooperating guides so that member 29 is confined to vertical movement only.

The member 31 rotatably supports the wheel structure 39 equipped with the brake structure 40 and hub cap 41. These portions are more or less diagrammatically illustrated. The brake structure may be closed by the casing 42. The conventional cooperating parts are omitted.

As the stub axle 29 moves up and down for independent wheel movement, the universal thrust rod construction 38, et cetera, see Fig. 1, automatically adjusts its position since it is universally connected to axle 29 at 35—36 to that necessary to confine the movement of the stub axle 29 to movement in a vertical plane.

The member 29 extends into the cylindrical housing 16, before mentioned, and is rigidly secured to or formed as a part of a sliding piston-like member indicated by the numeral 43. The same includes the tubular central portion 44 closed at its lower end as at 45 and four diverging wings or vanes 46, each of which is recessed at its upper end as at 47 and at its lower end as at 48. Each recess mounts a support 49 of tubular character about which is mounted a series of roller bearing members 50 which rotatably support the roller member 51. These roller members 51 are arcuate in cross section, although of cylindrical character, broadly speaking. In other words, they are somewhat barrel shaped and their curvature conforms to the curvature of the cylindrical interior 52 of the housing 16. As the wheel and stub axle move vertically relative to the frame, the mechanism shown within the chamber 52 also moves vertically.

When thrust rod 38 is omitted and cooperating guideways are not associated at the slot in the cylindrical housing, the interior of the cylinder may have guideways formed therein in which ride substantially cylindrical rollers 51 which prevents rotation of the piston-like member in this housing.

The closure 45 supports a rod 53 which extends upwardly through a closure structure 54 for the upper end of the chamber 52. This closure structure may, if desired, support a cylindrical portion 55 which is telescopically associated with a complementary cylinder portion 56, the opposite end of which is closed as at 57 and through which the rod 53 extends. A lock and adjusting nut structure 58 suitably secures the aforesaid together.

Nested within the two telescopically associated cylindrical portions 55 and 56 is a spring 59 concentric with the rod 53. Nested in the well portion 44 of the member 43 and bearing upon the closure 45 at the base thereof is a spring 60, the upper end of which bears against the underface of the closure 54. This spring is concentric with the rod 53. A closure 61 closes the lower end of the cylindrical chamber 52 and may be provided with a bumper or cushion member 62 for engagement by the closure 45 when the latter reaches its lowermost position. If desired, the telescopically associated members 55 and 56 may have a gland connection 63.

The aforesaid may, if desired, be of piston cylinder dashpot character.

It will, therefore, be noted that the load of the vehicle is transmitted through the support balls 19, 20 and 23 from the frame through the housing 16 to the cover 54 and thence through spring 60 to the stub axle 29. The spring construction above the upper closure 54 constitutes in effect a shock absorber arrangement.

From the foregoing description of the several parts, it will be noted in this form of the invention no longitudinal or transverse spring is utilized, although a load spring of coil character is utilized and also a shock absorber construction is employed, if desired. Furthermore, the support for the stub axle is adjustably supported upon the frame for camber adjustment purposes and the stub axle support has relative sliding movement with respect to this camber adjusted portion.

While the invention has been set forth in considerable detail in the foregoing description and illustrated in considerable detail in the drawings, the aforesaid is to be considered as illustrative and not restrictive in character. The several modifications illustrated herein, as well as mentioned, and many others, which will readily suggest themselves to persons skilled in this art, all are considered to be within the broad scope of this invention, reference being had to the appended claims.

The invention claimed is:

1. In an automobile, the combination with a frame, or the like, and an automobile wheel, of a wheel support structure, means for pivotally supporting said structure upon an axis substantially parallel to the longitudinal axis of the automobile, means for securing said structure in adjusted position on the first axis for camber, said wheel support structure including a pair of relatively movable members permitting up and down movement of the wheel relative to the frame, the relatively movable members having a rectilinear path of movement, and comprising a cylindrical housing and an elongated piston-like member slidable therein, said housing having an elongated slot and the piston-like member including a laterally projecting portion extending through the slot, and anti-friction means carried at opposite ends by the piston-like member and having bearing in the housing.

2. In an automobile, the combination with a frame, or the like, and an automobile wheel, of a wheel support structure, means for pivotally supporting said structure upon an axis substantially parallel to the longitudinal axis of the automobile, means for securing said structure in adjusted position on the first axis for camber, said wheel support structure including a pair of relatively movable members permitting up and down movement of the wheel relative to the frame, the relatively movable members having a rectilinear path of movement, and comprising a cylindrical housing and a piston-like member slidable therein, said housing having an elongated slot and the piston-like member including a laterally projecting portion extending through the slot, and anti-friction means carried by the piston-like member and having bearing in the housing, the wheel support structure including an arm extending toward the longitudinal and transverse axes of the frame and operatively pivoted on the frame to permit up and down wheel movement and prevent to and fro forward and backward movement, the frame having a cross-member juxtapositioned relative to the support structure, said second mentioned means including an arm rigid with the support structure and adjustable means connecting the last mentioned arm to the cross-member.

3. In an automobile, the combination with a frame, or the like, and an automobile wheel, of a wheel support structure, means for pivotally supporting said structure upon an axis substantially parallel to the longitudinal axis of the automobile, means for securing said structure in adjusted position on the first axis for camber, said wheel support structure including a pair of relatively movable members permitting up and down movement of the wheel relative to the frame, the relatively movable members having a rectilinear path of movement, and comprising a cylindrical housing and a piston-like member slidable therein, said housing having an elongated slot and the piston-like member including a laterally projecting portion extending through the slot, the wheel support structure including an arm extending toward the longitudinal and transverse axes of the frame and operatively pivoted on the frame to permit up and down wheel movement and prevent to and fro forward and backward movement, the frame having a cross-member juxtapositioned relative to the support structure, said second mentioned means including an arm rigid with the support structure and adjustable means connecting the last mentioned arm to the cross-member, and means for resisting said rectilinear movement.

4. In an automobile, the combination with a frame, or the like, and an automobile wheel, of a wheel support structure, means for pivotally supporting said structure upon an axis substantially parallel to the longitudinal axis of the automobile, means for securing said structure in adjusted position on the first axis for camber, said wheel support structure including a pair of relatively movable members permitting up and down movement of the wheel relative to the frame, the relatively movable members having a rectilinear path of movement, and comprising a cylindrical housing and a piston-like member slidable therein, said housing having an elongated slot and the piston-like member including a laterally projecting portion extending through the slot, the wheel support structure including an arm extending toward the longitudinal and transverse axes of the frame and operatively pivoted on the frame to permit up and down wheel movement and prevent to and fro forward and backward movement, the frame having a cross-member juxtapositioned relative to the support structure, said second mentioned means including an arm rigid with the support structure and adjustable means connecting the last mentioned arm to the cross-member, and load sustaining spring means between one of the relatively movable members and the frame.

5. In an automobile, the combination with a frame, or the like, and an automobile wheel, of a wheel support structure, means for pivotally supporting said structure upon an axis substantially parallel to the longitudinal axis of the automobile, means for securing said structure in adjusted position on the first axis for camber, said wheel support structure including a pair of relatively movable members permitting up and down movement of the wheel relative to the frame, the relatively movable members having a rectilinear path of movement, and comprising a cylindrical housing and a piston-like member slidable therein, said housing having an elongated slot and the piston-like member including a laterally projecting portion extending through the slot, the wheel support structure including an arm extending toward the longitudinal and transverse axes of the frame and operatively pivoted on the frame to permit up and down wheel movement and prevent to and fro forward and backward movement, the frame having a cross-member juxtapositioned relative to the support structure, said second mentioned means including an arm rigid with the support structure and adjustable means connecting the last mentioned arm to the cross-member, and dual spring means operatively interposed between said relatively movable members.

6. In an automobile, the combination with a frame, or the like, and an automobile wheel, of a wheel support structure, means pivotally supporting said structure upon an axis substantially parallel to the longitudinal axis of the automobile, and an arm rigid with said structure and extending toward the longitudinal axis thereof, said frame having a cross-member portion in vertical alignment therewith, and means connecting the opposite end of said arm to said cross-member for adjustably supporting said structure for camber purposes, said support structure including a pair of relatively movable members permitting up and down movement of the wheel relative to the frame, the member to which the first mentioned arm is secured being relatively stationary relative to the other member, the latter including an arm extending oppositely from the first mentioned arm and upon which the wheel is operatively supported, and means associated with the second mentioned arm for steering purposes.

7. In an automobile, the combination with a frame, or the like, and an automobile wheel, of a wheel support structure, means pivotally supporting said structure upon an axis substantially parallel to the longitudinal axis of the automobile, and an arm rigid with said structure and extending toward the longitudinal axis thereof, said frame having a cross-member portion in vertical alignment therewith, and means connecting the opposite end of said arm to said cross-member for adjustably supporting said structure for camber purposes, said support structure including a pair of relatively movable members permitting up and down movement of the wheel relative to the frame, the member to which the first mentioned arm is secured being relatively stationary relative to the other member, the latter including an arm extending oppositely from the first mentioned arm and upon which the wheel is operatively supported, means associated with the second mentioned arm for steering purposes, and a third arm operatively connected at one end to the second mentioned arm and extending towards the central longitudinal and transverse axes of and operatively connected to the frame to prevent to and fro substantial horizontal movement of the wheel and permitting up and down movement of said wheel.

FREDERICK E. CLEMONS.